W. E. HOLLAND.
BATTERY CELL CONSTRUCTION.
APPLICATION FILED JAN. 29, 1920.
1,371,894.
Patented Mar. 15, 1921.
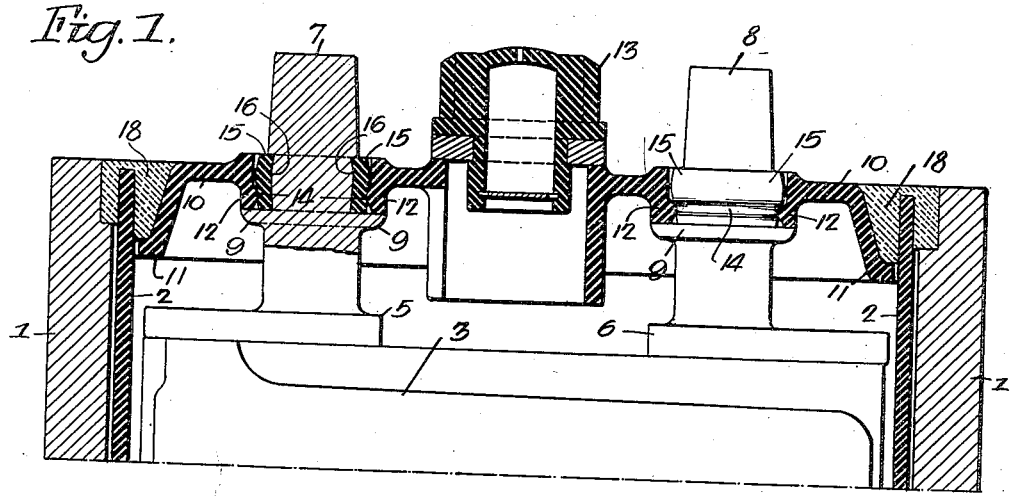
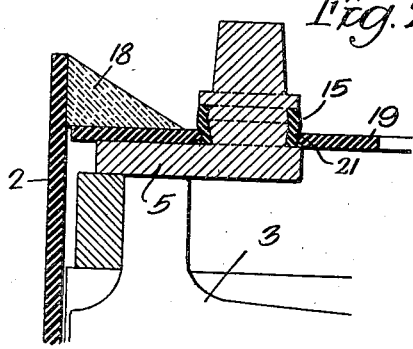
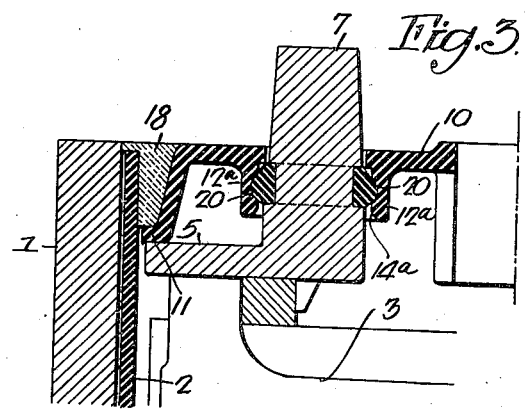
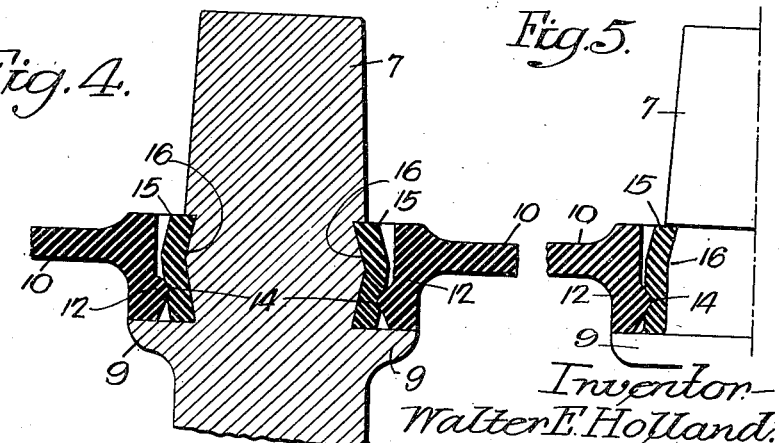
Inventor.
Walter E. Holland.
by his Attorneys
Howson & Howson

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

BATTERY-CELL CONSTRUCTION.

1,371,894. Specification of Letters Patent. Patented Mar. 15, 1921.

Application filed January 29, 1920. Serial No. 354,994.

*To all whom it may concern:*

Be it known that I, WALTER E. HOLLAND, a citizen of the United States, residing in Philadelphia, Pennsylvania, have invented Battery-Cell Constructions, of which the following is a specification.

One object of my invention is to provide a simple, inexpensive and relatively flexible joint or sealing connection particularly adapted for use between the terminal posts of a battery cell, or other electrolytic cell, and the cover of the container therefor; the invention more especially contemplating a combination of parts which may be quickly assembled or separated, and that without injury to its associated structures and without the use of tools.

It is further desired to provide a joint or connection of the character indicated which shall be capable of absorbing or cushioning shocks, vibrations or the like, and which shall consequently serve to prevent cracking or other injury to the sealing compound between a cover and the cell container which it closes.

Another object of my invention is to provide a connection or joint between the terminal posts of a storage battery cell and the cover of the container thereof, which shall positively lock said cover in place so that it cannot work loose nor be easily moved out of position.

Another object of my invention is to provide a method of sealing around the posts of a storage battery, which may be accomplished in a ready and efficient manner, and which will so assemble the battery that it may be disassembled in the same ready and efficient manner.

These objects and other advantageous ends I attain as hereinafter set forth, reference being had to the accompanying drawings, in which, Figure 1 is an elevation partly in vertical section taken through the terminal posts of a storage battery cell, illustrating my invention as applied thereto;

Figs. 2 and 3 are fragmentary sections similar to Fig. 1, illustrating modified forms of the invention;

Fig. 4 is a vertical section on an enlarged scale, showing in detail a construction similar to that of Fig. 1; and Fig. 5 is a fragmentary vertical section illustrating another modification of the invention.

In the above drawings, 1 represents a wooden container or tray in which is mounted a hard rubber, celluloid or other suitable jar 2 containing two sets of battery plates 3 and 4 to which are respectively connected transversely extending metallic straps 5 and 6. Projecting up from and formed integrally with these straps are two terminal posts 7 and 8, each of which in accordance with the preferred form of my invention is provided with an annular and preferably integral flange or collar 9 for supporting the cell cover 10. This latter is formed with an external outwardly projecting flange 11 and has openings with more or less elongated sleeves 12 for the terminal posts 7 and 8. Between these sleeves is a third opening having a vented cap or closure 13.

In accordance with the preferred form of my invention the lower edges of the sleeves 12 rest respectively upon the flanges 9 of the posts and each of them has projecting from its inner surface an annular rib or bead 14 below which it is outwardly flared. That portion of each of the terminal posts which extends within the sleeve 12 is preferably of reduced diameter, or is bounded by flanges or shoulders, to provide an annular recess for the reception of a gasket or ring 15 of pliable and preferably resilient material such as soft rubber.

That portion of each post inclosed by the gasket or ring 15 and within the annular recess, is formed with an outwardly projecting annular rib or bead 16 so positioned that when the cover 10 rests upon the flanges 9, the greatest diameter of said rib 16 lies above the opening of least diameter of the sleeve 12 as defined by the high point of the bead or rib 14. The tubular rubber or other sealing ring 15 is of such diameter that after being stretched and forced over the upper end of the terminal post, it will spring into and closely fit within the annular recess of said post, conforming more or less to the shape of the post within the recess so that it has an annular rib opposite that of said post. The length of the rubber sealing ring is preferably substantially equal to the height of the recess and it may be cemented to the post if desired.

When in the course of assembling the battery cell the cover 10 is placed over the terminal posts 7 and 8, each of these enters its sleeve 12 and as said cover is forced downwardly the upper ends of the rubber sealing rings 15, which preferably have previously been moistened with water or other lubricant, likewise enter said sleeves. The continued forcible downward movement of the cover causes the beads or ribs 14 to compress the rubber sealing rings until finally said ribs spring past the parts of maximum diameter of the sealing rings and further downward movement of the cover is prevented by the lower edges of the sleeves 12 coming to rest in engagement with the shoulders 9 of the terminal posts.

The minimum internal diameter of the opening defined by the rib 14 bears such a relation to the external diameter of the rubber sealing ring at the point of coming to rest that when the parts are assembled as shown in Fig. 1, liquid-tight joints are made between the cover and the terminal posts, due to the soft rubber being in compression, so that there is no possibility of escape of the electrolyte. At the same time, owing to the resilience of the gaskets or sealing rings 15 between the posts and the coacting cover ribs 14, any movement of the relatively heavy plates within the cell does not strain the cover nor tend to crack the sealing compound 18 which after the parts have been assembled, is placed between said cover and the upper part of the wall of the jar 2.

Instead of employing a molded cover having sleeves 12 and annular ribs 14 therein, I may if desired, utilize a flat cover or plate 19 (Fig. 2) having circular openings for the terminal posts. The cover edges 21 defining the post openings are preferably beveled or rounded so that they act in effect like the ribs 14 in that form of my invention shown in Fig. 1,—the downward flare of the opening in both instances serving to insure the entrance of the sealing ring or gasket without stripping it from the post. In the style of battery cell shown in Fig. 2, the plate-connecting straps 5 serve to directly support the cover 19, thus doing away with the necessity of shoulders 9 (Fig. 1) on the posts. In assembling the cell said cover is forced over the yielding sealing rings 15 which as before are held between shoulders forming annular recesses on the posts. The portions of the posts between the shoulders are preferably tapered both upwardly and downwardly from a plane above that at which the cover edges 21 ultimately come to rest, forming annular ribs or protuberances which like those of the posts shown in Fig. 1, coact with the cover to compress the sealing rings and lock the cover in position so as to form flexible liquid-tight joints which will not loosen when subjected to vibration.

In that form of my invention shown in Fig. 3, the cover 10 while having the same general form as that of Fig. 1, has in its openings for the terminal posts, sleeves 12ª which are formed with internal annular recesses. There is thus formed an annular, internally projecting rib 14ª at the lower portion of each sleeve whose upper end is preferably inwardly flanged to more or less closely fit its associated terminal post. Each of these latter has an annular recess, although in this case the resilient rubber or other sealing gasket or ring is itself shaped with an outwardly projecting annular rib portion 20 and is fitted onto what in this case is the cylindrical surface of the recessed portion of the terminal post. When the cover is forced into place this projecting rib of the sealing ring is first greatly compressed as it passes the rib 14ª at the lower portion of its coacting sleeve and thereafter it springs into the annular recess above said rib, in which position however it still remains under sufficient compression to make a liquid-tight joint.

In that form of the invention shown in Fig. 5 I have as before formed the terminal post with an annular recess for the reception of the rubber ring 15, although I have made the main portion of the post within this recess cylindrical rather than downwardly tapered as in Figs. 1 and 4. While as before the upwardly tapering part of the recess allows the top of the rubber packing ring likewise to taper inwardly so as to facilitate its entrance into the post opening of the cover, the rib 14 of the latter is maintained in its final position, with the lower edge of the sleeve resting on the shoulder 9 of the terminal post, by reason of its frictional grip or bite on the lower part of said packing ring. As in the other case the compression of the said ring is sufficient to insure liquid-tight joints with the terminal post and with the cover.

In all of the above cases it will be seen that the cover is formed with post openings each having what is in effect an annular projecting portion or rib positioned to coact with a terminal post to maintain compression on an intermediate resilient packing ring and thus form a flexible, liquid-tight joint between said cover and post,—it being noted that the post carries a rib which may be either integral and act to distort the rubber or other resilient ring or the resilient ring may itself be provided with an annular rib performing the same function.

With such a combination it is obvious that even though the plate groups of the cell should tend to move violently in relation to the jar, the resulting blow or shock, instead of being transmitted directly to the cover and straining the latter or cracking the sealing compound around its edges, is absorbed by the resilient sealing rings and that without permitting the escape of liquid. Another important advantage of the construction is that no sealing compound is required to make the post joints liquid-tight nor are any tools needed either to place the cover in position on the posts, or to remove it therefrom. While under operating conditions the cover cannot become so loosened as to come off of the terminal posts (since vibration only tends to seat it the more firmly), it is possible after the plate elements and cover have been withdrawn from the jar, to remove the cover from the posts manually by pressing on the terminal posts with the thumbs while at the same time pulling on the edges of the cover with the fingers.

I claim:

1. The combination of a container; a structure therein having a post; a cover for the container having an opening through which said post extends; and a resilient sealing ring between the post and the cover, there being an annular rib on one of said latter elements whereby said ring is maintained under radial compression to form a liquid-tight joint.

2. The combination in a battery cell of a terminal post having an annular projecting rib; a cover having an opening for said post and including an annular portion normally centered below said rib; with a resilient sealing ring on the post maintained under compression between said rib and the annular portion of the cover to form a liquid-tight joint.

3. The combination in a battery cell of a cover having an opening formed with an annular rib; a terminal post extending through said opening and having a second annular rib normally centered above the rib of the cover; with a ring of resilient material coacting with said two ribs to form a liquid-tight joint.

4. The combination in a battery cell of a cover having openings formed with inwardly extending annular ribs; plates supporting said cover and having terminal posts respectively extending through said openings of the cover, each of said posts having an annular recess formed with an outwardly projecting annular rib therein normally extending in a plane above the ribs of the cover; with flexible sealing rings mounted in the recesses of the posts and coacting with the annular ribs of the latter and of the cover to form liquid-tight joints.

5. The combination in a battery cell of a cover having sleeves provided with inwardly extending annular ribs; a terminal post extending through each of the openings and each formed with an outwardly extending annular rib centered above the rib of its associated sleeve; with relatively flexible rings mounted within the sleeves of the cover and coacting with the ribs of the latter and of the post to form liquid-tight joints.

6. The combination in a battery cell of a cover having a sleeve provided with an inwardly projecting annular rib; a terminal post extending through said sleeve; with a flexible packing ring mounted on said post and having an annular portion extending outwardly above the annular rib of the cover.

7. The combination in a battery cell of a cover having an opening formed with an inwardly projecting annular rib; a terminal post formed with an annular recess; and a resilient ring in said recess coacting with said rib to form a liquid-tight joint.

8. The combination in a battery cell of a cover having an opening formed with an inwardly projecting annular rib; a terminal post formed with an annular recess; with a resilient ring in said recess coacting with said rib of the cover to form a liquid tight joint, and having an annular outwardly extending portion above the rib of the cover.

9. The combination in a battery cell of a cover having an opening formed with an inwardly projecting annular rib; a terminal post; with a resilient ring in said recess coacting with said rib of the cover to form a liquid tight joint, said terminal post having an annular rib above the rib of the cover positioned to force the ring outwardly above said rib.

10. The combination in a battery cell of a container; a cover therefor having openings; a sealing compound between the cover and the container; plates in the container; terminal posts for the plates respectively extending through said openings; and packing rings on the posts respectively, the latter and the cover being formed with coacting annular ribs one inside the other forming liquid-tight joints with said packing rings respectively.

11. The combination of a container; a structure therein having a post; a cover for the container having an opening through which said post extends, and a resilient sealing ring between the post and the cover, the latter having an annular rib whereby said ring is maintained under radial compression to form a liquid-tight joint.

12. A battery cell cover having a post opening formed with an inwardly-projecting, inwardly-tapering annular rib; a terminal post; and a pliable packing ring on the post; said post coacting with said cover to maintain compression on the packing ring.

13. A battery cell cover having a post opening formed with an inwardly-projecting, inwardly-tapering endless rib.

14. A battery cell cover having a post opening and a sleeve mounted in said opening and formed with an inwardly-projecting, inwardly-tapering endless rib.

15. A battery cell post formed with shoulders; a pliable packing ring mounted between said shoulders and having its outer surface sloped to facilitate the passage over it of a cover.

16. A battery cell post having a sloping portion; a pliable packing ring mounted thereon and having its outer surface conforming to the slope of the post to facilitate the passage over it of a cover.

17. The combination in a battery cell of a cover having a post opening therein; a cell post extending through the opening; and a pliable retaining packing mounted on one of said parts and interlocking with the other part, said cover being capable of assembly and separation on compressing the pliable retaining packing.

18. A battery cell post formed with shoulders; a pliable packing ring mounted on the post between said shoulders; and a cover having a post opening including an engaging portion of less diameter than the greatest diameter of the mounted packing ring, the parts being adapted for assembly and separation by forcible relative movement.

19. The process of sealing around the posts of a cell comprising the mounting of a resilient gasket on a suitably prepared post and placing thereover a closure means having coöperating openings therein so shaped that the downward thrust operates as a radial pressure to form an interlocking connection without further manipulation, thereby rendering the same freely removable without additional mechanical means.

WALTER E. HOLLAND.